US012071156B2

(12) United States Patent
Buchanan et al.

(10) Patent No.: US 12,071,156 B2
(45) Date of Patent: Aug. 27, 2024

(54) PLANNING FOR OCCLUSIONS WITH SURFEL MAPS

(71) Applicant: Waymo LLC, Mountain View, CA (US)

(72) Inventors: Michael Buchanan, Palo Alto, CA (US); Aleksandar Rumenov Gabrovski, Mountain View, CA (US); Colin Andrew Braley, Mountain View, CA (US); David Yonchar Margines, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 582 days.

(21) Appl. No.: 17/036,926

(22) Filed: Sep. 29, 2020

(65) Prior Publication Data
US 2022/0097726 A1   Mar. 31, 2022

(51) Int. Cl.
*B60W 60/00*      (2020.01)
*B60W 30/095*    (2012.01)
(Continued)

(52) U.S. Cl.
CPC ...... *B60W 60/001* (2020.02); *B60W 30/0956* (2013.01); *B60W 30/18163* (2013.01);
(Continued)

(58) Field of Classification Search
CPC ........... B60W 60/001; B60W 30/0956; B60W 30/18163; B60W 2420/42; B60W 2554/4026; B60W 2554/4029; G05D 1/0214; G05D 1/0246; G05D 2201/0213; G05D 1/024; G05D 1/0255; G05D 1/0257; G05D 1/0274; G06V 20/58; G06V 20/64
See application file for complete search history.

(56) References Cited

U.S. PATENT DOCUMENTS

| | | | |
|---|---|---|---|
| 2018/0005407 A1* | 1/2018 | Browning | G05D 1/024 |
| 2018/0178800 A1* | 6/2018 | Ishii | G08G 1/09623 |
| 2019/0056749 A1* | 2/2019 | Kim | H04N 13/211 |

(Continued)

OTHER PUBLICATIONS

Scene Flow Propagation for Semantic Mapping and Object Discovery in Dynamic Street Scenes, 2016 (Year: 2016).*
Behley et al., "Efficient Surfel-Based SLAM using 3D Laser Range Data in Urban Environments," Robotics: Science and Systems, 2018, 10 pages.

(Continued)

*Primary Examiner* — Ian Jen
*Assistant Examiner* — Renee LaRose
(74) *Attorney, Agent, or Firm* — Fish & Richardson P.C.

(57) ABSTRACT

Methods, systems, and apparatus for generation and use of surfel maps to plan for occlusions. One of the methods includes receiving a previously-generated surfel map depicting an area in which a vehicle is located, the surfel map comprising a plurality of surfels, each surfel corresponding to a respective different location in the area in which a vehicle is located; receiving, from one or more sensors, sensor data representing the area in which the vehicle is located; determining, based on the sensor data, that the area in which a vehicle is located includes a dynamic object having a changed shape relative to its representation in the surfel map; and generating an updated path for the vehicle to travel that avoids an occlusion by the changed shape of the dynamic object of a line of sight of one or more sensors to an area of interest.

20 Claims, 4 Drawing Sheets

(51) Int. Cl.
- *B60W 30/18* (2012.01)
- *G05D 1/00* (2024.01)
- *G06V 20/58* (2022.01)
- *G06V 20/64* (2022.01)

(52) U.S. Cl.
CPC ......... *G05D 1/0214* (2013.01); *G05D 1/0246* (2013.01); *G06V 20/58* (2022.01); *B60W 2420/403* (2013.01); *B60W 2554/4026* (2020.02); *B60W 2554/4029* (2020.02); *G06V 20/64* (2022.01)

(56) References Cited

U.S. PATENT DOCUMENTS

| | | | |
|---|---|---|---|
| 2020/0272148 A1* | 8/2020 | Karasev | G01S 13/58 |
| 2020/0301799 A1* | 9/2020 | Manivasagam | G06T 17/20 |
| 2022/0063662 A1* | 3/2022 | Sprunk | G06V 20/58 |

OTHER PUBLICATIONS

Park et al., "Probabilistic Surfel Fusion for Dense LiDAR Mapping," Proceedings of the IEEE International Conference on Computer Vision, 2017, pp. 2418-2426.

Pfister et al., "Surfels: surface elements as rendering primitives," Proceedings of the 27th annual conference on Computer graphics and interactive techniques, 2000, pp. 335-342.

Schops et al., "SurfelMeshing: Online Surfel-Based Mesh Reconstruction," CoRR, Oct. 2018, arxiv.org/abs/1810.00729v1, 13 pages.

Stuckler et al., "Efficient Mobile Robot Navigation using 3D Surfel Grid Maps," In Proc. of the German Conference on Robotics, May 2012, 5 pages.

Stuckler et al., "Multi-Resolution Surfel Maps for Efficient Dense 3D Modeling and Tracking," Journal of Visual Communication and Image Representation, Jan. 2014, 25(1):137-147.

Wang et al., "Real-time Scalable Dense Surfel Mapping," 2019 International Conference on Robotics and Automation, May 2019, pp. 6919-6925.

\* cited by examiner

PLANNING FOR OCCLUSIONS WITH SURFEL MAPS

TECHNICAL FIELD

This disclosure relates to processing and annotation of maps, and more particularly to the generation and use of surfel maps to plan for occlusions.

BACKGROUND

Autonomous vehicles may include self-driving cars, boats, aircraft, or other vehicle types. Autonomous vehicles use a variety of on-board sensors in tandem with map representations of the environment in order to make control and navigation decisions. However, without additional information regarding the objects in the environment depicted by the map representation, interpretation of conflicts between the real-time sensor data and the map representation of the environment can be challenging. For example, vegetation, such as bushes and hedges, change over time (e.g., due to growth or trimming) and are therefore difficult to track using traditional mapping techniques, which makes planning navigation decisions proximate vegetation difficult.

SUMMARY

This specification describes how a vehicle, e.g. an autonomous or semi-autonomous vehicle, can use a surfel map and real-time sensor data to generate a prediction for a state of an environment surrounding the vehicle. For example, the techniques described in this specification allow a system to adjust plans to account for objects in the environment that may change over time and occlude the view of one or more sensors on a vehicle used to detect the state of an environment surrounding the vehicle. A system on-board the vehicle can obtain the surfel data, e.g. surfel data that has been generated by one or more vehicles navigating through the environment at respective previous time points, from a server system and the sensor data from one or more sensors on-board the vehicle. The system can then combine the surfel data and the sensor data to generate a prediction for one or more objects detected in the environment, and generate a planned path of travel for the vehicle based on this prediction.

In addition, the techniques described in this application can be used to plan for and avoid collision with one or more objects that may be objects that may be occluded from the line of sight of the sensors on the vehicle. For example, certain portions of a planned path (e.g., intersections) are likely to include transitory objects, such as vehicles or cyclists, that may be occluded from the line of sight of the sensors on the vehicle due to the presence of one or more stationary objects in the environment, such as signs or buildings. By utilizing surfel data provided in a surfel map, occlusion of the line of sight of sensors on the vehicle by objects in the environment can be predicted and minimized through path planning in order to reduce occlusions and minimize risk of collision with potentially occluded objects. For example, based on the surfel data, the planned path for a vehicle can be determined and adjusted to avoid colliding with or cutting off a bicycle or vehicle in an area of the planned path that is likely to include such transitory objects and that includes other objects in the environment, such as buildings or signs, that may occlude transitory objects from the line of sight of the vehicle's sensors.

Particular embodiments of the subject matter described in this specification can be implemented so as to realize one or more of the following advantages The system need not treat the existing surfel data or the new sensor data as a ground-truth representation of the environment. Instead, the system can assign a particular level of uncertainty to both the surfel data and the sensor data, and combine both forms of data to generate a representation of the environment that is typically more accurate than either the surfel data or the sensor data in isolation.

Some existing systems use a 2.5-dimensional system to represent an environment, which limits the representation to a single element having a particular altitude for each (latitude, longitude) coordinate in the environment. Using techniques described in this specification, a system can instead leverage a three-dimensional surfel map to make autonomous driving decisions. The three-dimensional surfel map allows multiple different elements at respective altitudes for each (latitude, longitude) coordinate in the environment, yielding a more accurate and flexible representation of the environment.

Some existing systems rely entirely on existing representations of the world generated offline using sensor data generated at previous time points, to navigate through a particular environment. These systems can be unreliable, because the state of the environment might have changed since the representation was generated offline. Some other existing systems rely entirely on sensor data generated by the vehicle at the current time point to navigate through a particular environment. These systems can be inefficient, because they fail to leverage existing knowledge about the environment that the vehicle or other vehicles have gathered at previous time points. Using techniques described in this specification, an on-board system can combine an existing surfel map and online sensor data to generate a prediction for the state of the environment. The existing surfel data, such as one or more semantic labels, allows the system to get a jump-start on the prediction and plan ahead for regions that are not yet in the range of the sensors of the vehicle, while the sensor data allows the system to be agile to changing conditions in the environment. Further, using techniques described in this specification, semantic labels characterizing one or more objects in the environment depicted by the surfel map can be used by the on-board system to more accurately interpret online sensor data received by the system and corresponding to the respective environment.

In addition, using techniques described in this specification can improve the safety and reliability of autonomous and semi-autonomous vehicles. Further, the techniques described herein enable a system to anticipate and plan for dynamically changing environments objects in the environment that may change over time. As a result, minimal or no human intervention is required to accurately navigate a vehicle through a dynamically changing environment. In addition, by synthesizing previously-generated surfel data and real-time sensor data, accurate, real-time adjustments can be made to the planned path for a vehicle with increased efficiency to account for a changing environment. For example, using techniques described in this specification, the likelihood that an object within an environment has changed can be predicted, and as a result, the amount of margin within the path of travel afforded the particular object to account for potential changes to the object can be more accurately allocated. For example, if a surfel represents a brick wall, the system can be more confident that the brick wall hasn't moved, and therefore the occlusion of the line of sight of the vehicle's sensors will be very similar or exactly the same as it was before when the brick wall was previously encountered by the vehicle. On the other hand, if the surfel represents tall grass, then the system can be more confident that the grass will have changed.

In addition, by using the techniques described in this specification, the system can better plan behavior based on how other vehicles will act due to their own occlusions. For example, the system can determine whether the view of a driver and/or a sensor system of an oncoming vehicle is occluded. Therefore, movement of an oncoming vehicle can be predicted with improved accuracy, and the safety of the driving plans can be enhanced. For example, a vehicle's planning system can determine based on the environment whether the line of sight of another vehicle is occluded. As a result, the planning system can determine whether a vehicle is moving because creeping forward to get a better view (e.g., of an intersection), or alternatively that the oncoming vehicle is starting their turn because they don't see oncoming traffic. As such, the planning system can decide to wait for cars having occluded views to pass rather than relying on those cars being able to see the vehicle.

Using a surfel representation to combine the existing surfel data and the new sensor data can be particularly efficient with respect to the time, memory, and processing power required. Using techniques described in this specification, a system can quickly integrate new sensor data with the data in the surfel map to determine one or more characteristics of an object within an environment and predict the accuracy of the sensor data. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that that must be untangled. Updating the mesh can therefore be a lengthy and computationally expensive process.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes systems, apparatus, and methods for detecting and planning for sensor occlusions using a surfel map with semantic labels.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g. a vector with a magnitude of 1 that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples. In some implementations, different surfels in a surfel map can have different sizes, so that a surfel map can have varying levels of granularity depending on the environment described by the surfel map; e.g., large surfels can corresponds to large, flat areas of the environment, while smaller surfels can represent areas of the environment that require higher detail.

In this specification, a surfel map is a collection of surfels that each correspond to a respective location in the same environment. The surfels in a surfel map collectively represent the surface detections of objects in the environment. As will be described in further detail herein, each surfel in a surfel map can have additional data associated with it, e.g. one or more semantic labels describing the surface or object characterized by the surfel.

A surfel map can characterize a real-world environment, e.g. a particular portion of a city block in the real world, or a simulated environment, e.g. a virtual intersection that is used to simulate autonomous driving decisions to train one or more machine learning models. As a particular example, a surfel map characterizing a real-world environment can be generated using sensor data that has been captured by sensors operating in the real-world environment, e.g. sensors on-board a vehicle navigating through the environment. In some implementations, an environment can be partitioned into multiple three-dimensional volumes, e.g. a three-dimensional grid of cubes of equal size, and a surfel map characterizing the environment can have at most one surfel corresponding to each volume.

Figure 1A:
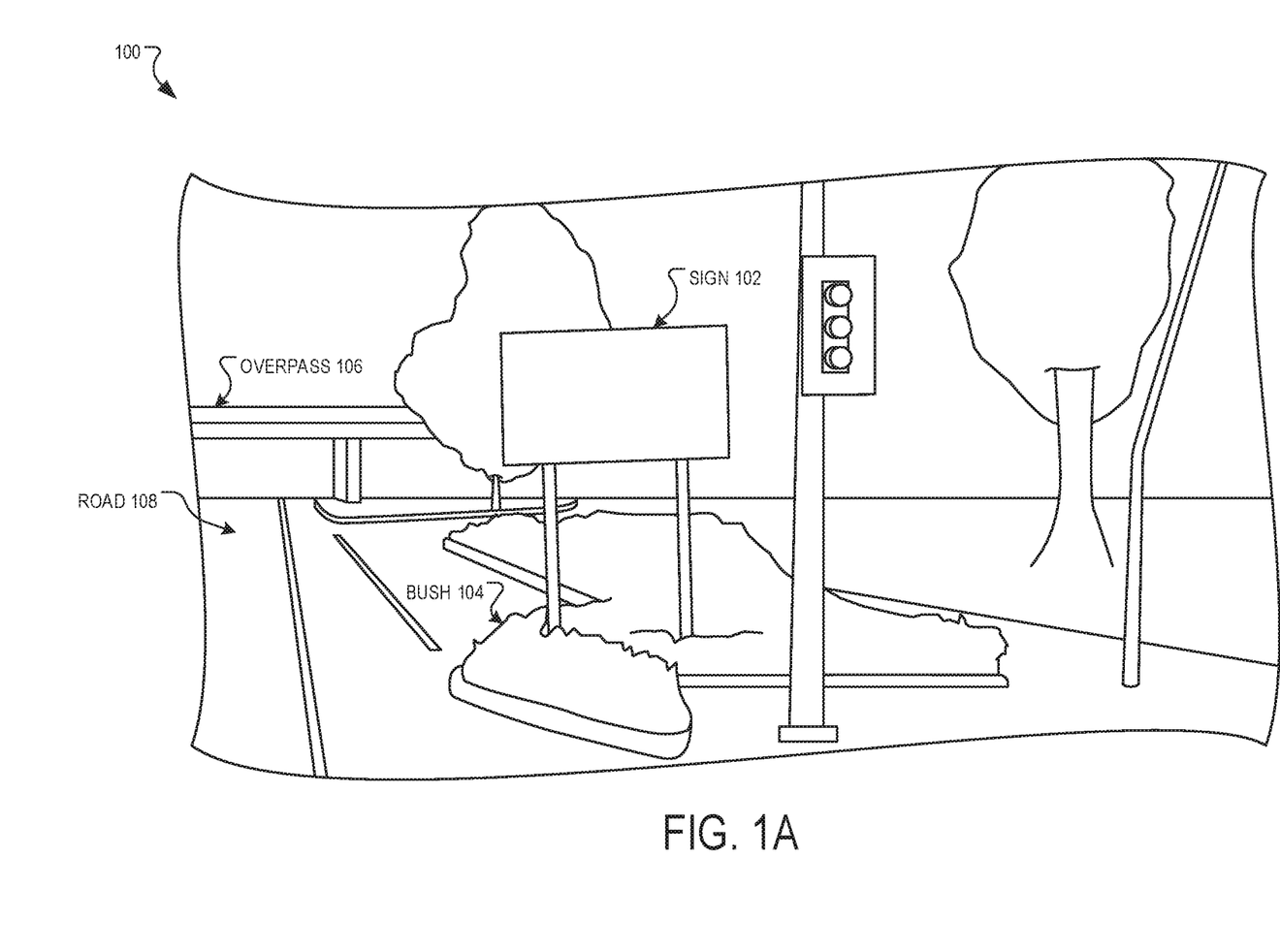
FIG. 1A is an illustration of an example environment.

FIG. 1A is an illustration of an example environment 100. The environment 100 is depicted from the point of view of a sensor on-board a vehicle navigating through the environment 100. The environment 100 includes a sign 102, a bush 104, an overpass 106, and a road 108.

Figure 1B:
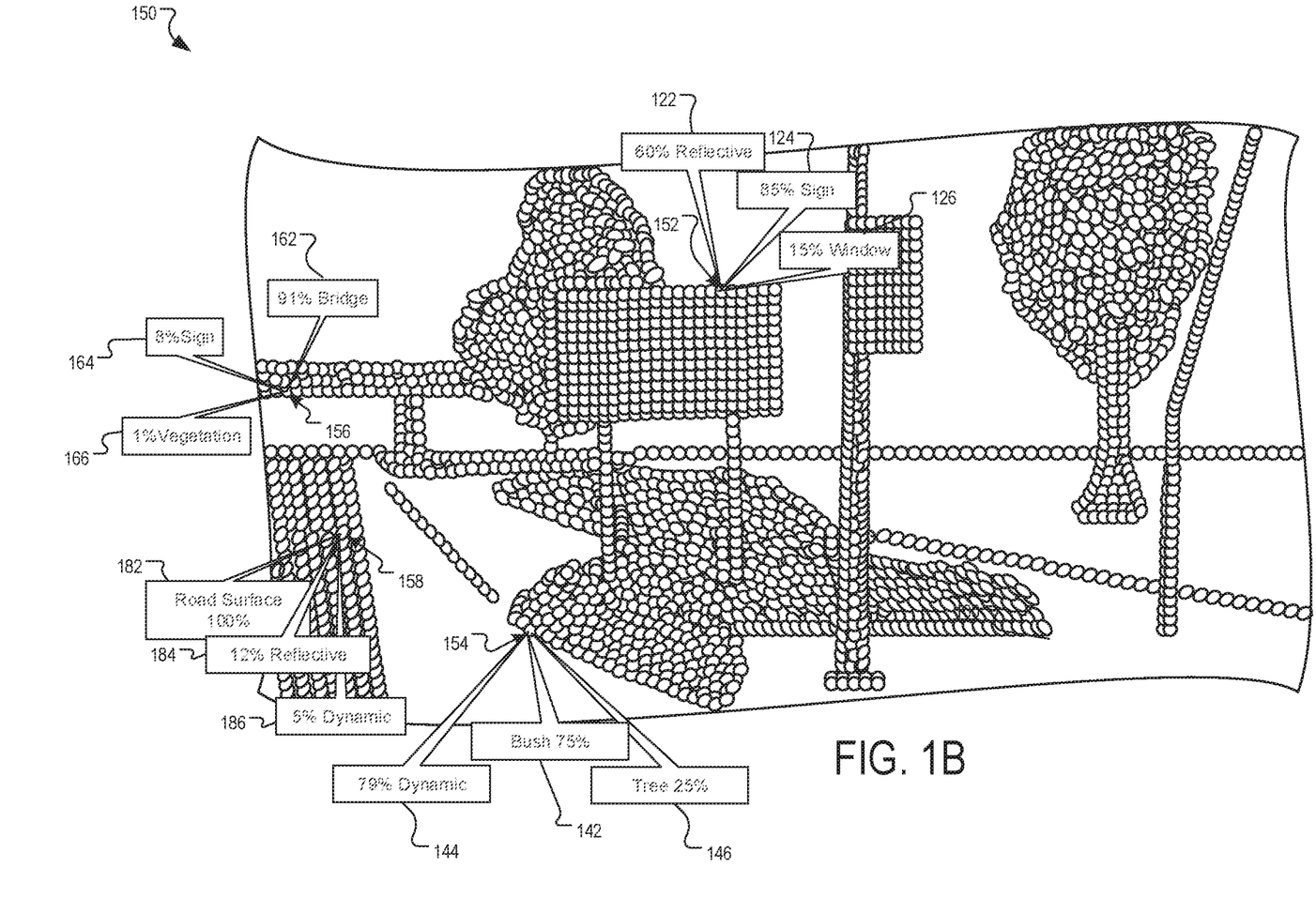
FIG. 1B is an illustration of an example surfel map of the environment of FIG. 1A.

FIG. 1B is an illustration of an example surfel map 150 of the environment 100 of FIG. 1A. As can be seen in FIG. 1B, the surfel map 150 includes a plurality of surfels 152, 154, 156, 158 that represent the objects in the environment 100 depicted in FIG. 1A. Each surfel in the surfel map 150 is represented by a disk, and defined by three coordinates (latitude, longitude, altitude) that identify a position of the surfel in a common coordinate system of the environment 100, and by a normal vector that identifies an orientation of the surfel. For example, each surfel can be defined to be the disk that extends some radius, e.g. 1, 10, 25, or 100 centimeters, around the coordinate (latitude, longitude, altitude). In some other implementations, the surfels can be represented as other two-dimensional shapes, e.g. ellipsoids or squares.

In generating the surfel map 150, the environment 100 can be partitioned into a grid of equal-sized voxels, and each voxel in the grid of the environment 100 can contain at most one surfel, where, e.g., the coordinate (latitude, longitude, altitude) of each surfel defines the voxel that the surfel occupies. That is, if there is a surface of an object at the location in the environment corresponding to a voxel, then there can be a surfel characterizing the surface in the voxel; and if there is not a surface of an object at the location, then the voxel is empty. In some other implementations, a single surfel map can contain surfels of various different sizes that are not organized within a fixed spatial grid.

For any latitude and longitude in the environment 100, i.e. for any given position (latitude, longitude) in a plane running parallel to the ground of the environment 100, the surfel map 150 can include multiple different surfels each corresponding to a different altitude in the environment 100, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 106 in the environment 100 and the road 108 underneath the overpass 106. The surfel map, on the other hand, is able to represent both the overpass 106 and the road 108 underneath the overpass 106, e.g. with an overpass surfel 156 and a road surfel 158 that have the same latitude coordinate and longitude coordinate but a different altitude coordinate.

As can be seen in FIG. 1B, the surfel map 150 can include one or more semantic labels 122, 124, 126, 142, 144, 146, 162, 164, 166, 182, 184, 186, each semantic label corresponding to a respective surfel 152, 154, 156, 158 in the surfel map 150 and providing semantic information characterizing the respective surfel. For example, each surfel 152, 154, 156, 158 in the surfel map 150 can have one or more corresponding semantic labels 122, 124, 126, 142, 144, 146, 162, 164, 166, 182, 184, 186 that each indicate a predicted characteristic of the object represented by the respective surfel.

As can be seen in FIG. 1B, one or more of the surfels 152, 154, 156, 158 in the surfel map 150 can be associated with multiple semantic labels (or a "vector" of semantic labels). For example, the surfel 158 representing the road 108 in the environment 100 has three semantic labels: a first label 182 identifying the surfel 158 as representing a road surface, a second label 184 identifying the surfel 158 as representing a non-reflective object, and a third label 186 identifying the dynamism of the object represented by the surfel 158.

Each semantic label can include a respective probability indicating the likelihood that the object in the environment represented by the respective surfel has the characteristic represented by the semantic label. For example, surfel 156 in surfel map 150 representing overpass 106 in environment 100 includes three semantic labels 162, 164, 166: a first semantic label 162 indicating a 91% probability that the object represented by the surfel 156 is a bridge, a second semantic label 164 indicating an 8% probability that the object represented by the surfel 156 is a sign, and a third semantic label 166 indicating a 1% probability that the object represented by the surfel 156 is vegetation.

Semantic labels can be used to predict the object type of the object being represented by the respective surfel. For example, surfel 152 in surfel map 150 representing sign 102 in environment 100 includes semantic labels 124 and 126 that indicate a predicted object type for the object represented by surfel 152. As can be seen in FIG. 1B, semantic label 124 indicates an 85% probability that the object represented by surfel 152 is a sign and semantic label 126 indicates a 15% probability that the object represented by surfel 152 is a window 126. Object type semantic labels can include any type of object that could be found in the environment including, but not limited to, trees, bushes, hedges, vegetation, buildings, road surfaces, signs, windows, sidewalks, vehicles, pedestrians, etc.

As another particular example, each surfel can have one or more semantic labels, with associated probabilities, predicting the dynamism of the object characterized by the surfel. The dynamism of an object is a property having a system-generated value that represents whether or not the object is likely to change over time. For example, a semantic label can have low dynamism when the object, e.g., a building, has a low associated probability for changing over time. On the other hand, a semantic label can have high dynamism when the object, e.g., a bush, has a high associated probability for changing over time. As another example, a semantic label of "branches on trees" indicates high dynamism, as tree branches have a high associated probability for changing over time (e.g., as the branches swing and/or are trimmed), whereas a semantic label of "trunk of tree" indicates low dynamism since a tree trunk has a lower probability of changing over time.

In some implementations, the semantic label indicating the dynamism of the object represented by the surfel includes an associated probability. For example, as depicted in FIG. 1B, surfel 158 representing road 108 in environment 100 includes semantic label 186 indicating a 5% probability that the object represented by the surfel 158 is a dynamic object. In contrast, surfel 154 representing bush 104 in environment 100 includes a semantic label 144 indicating a 79% probability that the object represented by the surfel 154 is a dynamic object. In some implementations, the predicted dynamism of an object represented by a surfel can be determined based on one or more semantic labels that indicate the type of object represented by the surfel (e.g., a building object type semantic label indicates a lower level of dynamism than a semantic label indicating a vegetation object type).

Various classes of semantic information can be represented by semantic labels, such as object type, color, reflectively, or opacity of the object characterized by the surfel. For example, the surfel map 150 includes a surfel 154 that characterizes a portion of bush 104 depicted in FIG. 1A. As depicted in FIG. 1B, surfel 154 includes a first semantic label 142 predicting with 75% probability that the type of the object characterized by the surfel 154 is "bush" and another semantic label 146 predicting with 25% probability that the type of the object characterized by the surfel 154 is "tree". Because bushes can grow, be trimmed, and die with relative frequency, the semantic label 144 labelling surfel 154 as "dynamic" has a 79% probability. In some implementations, the surfel 154 might have color labels predicting the color of the bush 104 to be "green" with 70% probability and "yellow" with 30% probability. Because the bush 104 is not completely opaque, a semantic label predicting the opacity of the object represented by the surfel 154 might predict that the object is "opaque" with 70% probability. Further, as the bush 104 is not generally reflective, a semantic label predicting the reflectivity of the object represented by the surfel 154 might predict that the object is "reflective" with 1% probability. The semantic labels and respective probabilities for each surfel 152, 154, 156, 158 can be generated by a trained machine learning model.

After a surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map, including the semantic labels of the surfel map, along with real-time sensor measurements of the environment in order to make better driving decisions than if the vehicle were to rely on the real-time sensor measurements alone.

Figure 2:
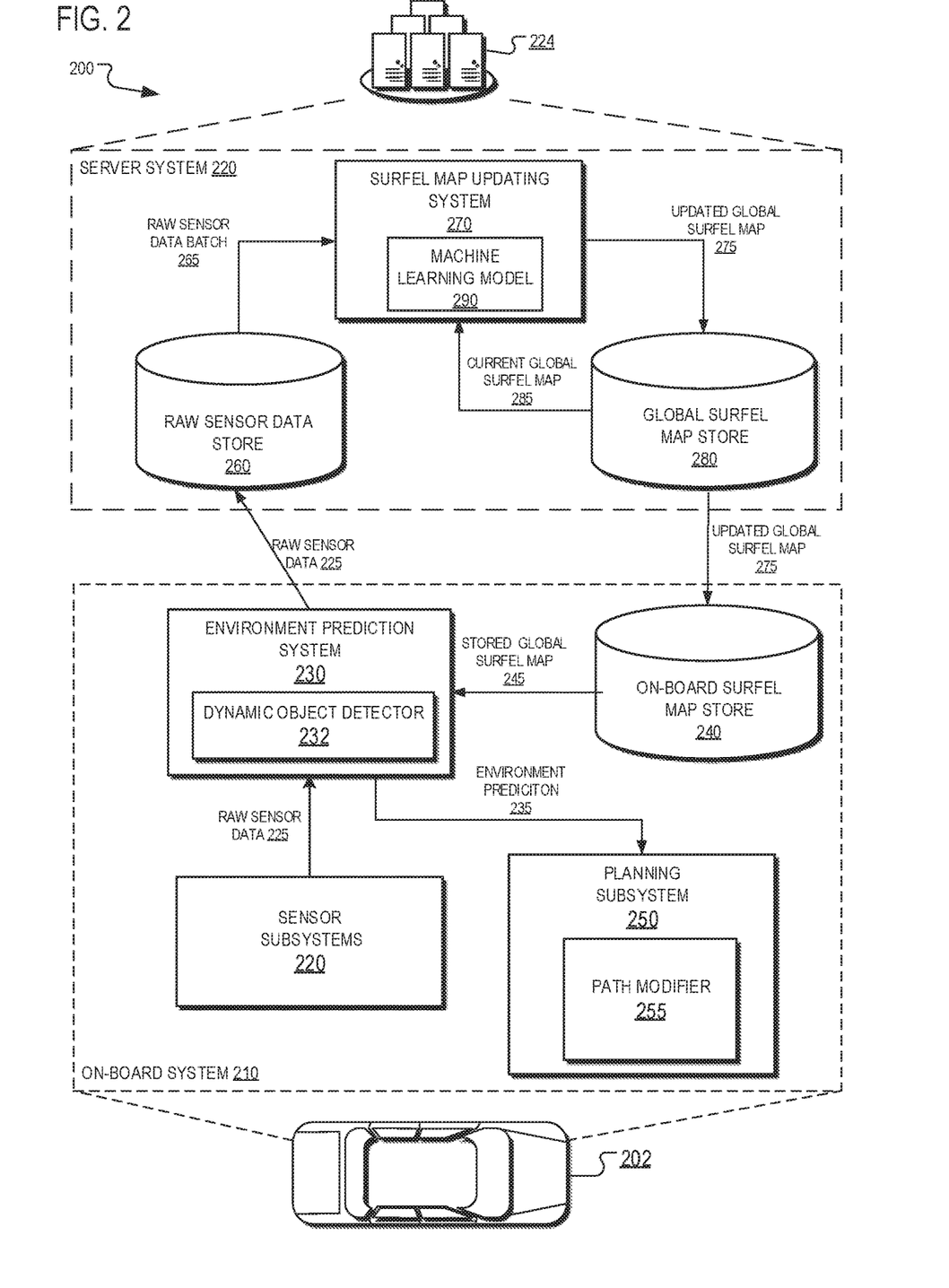
FIG. 2 is a diagram of an example system.

FIG. 2 is a diagram of an example system 200 for generating and implementing a surfel map with semantic labels, such as surfel map 150 of FIG. 1B. The system 200 can include multiple vehicles, each with a respective on-board system. For simplicity, a single vehicle 202 and its on-board system 210 are depicted in FIG. 2. The system 200 also includes a server system 220 that is accessible by every vehicle in the system 200.

The vehicle 202 in FIG. 2 is illustrated as an automobile, but the on-board system 210 can be located on-board any appropriate vehicle type. The vehicle 202 can be a fully autonomous vehicle that determines and executes fully-autonomous driving decisions in order to navigate through an environment. The vehicle 202 can also be a semi-autonomous vehicle that uses predictions to aid a human driver. For example, the vehicle 202 can autonomously apply the brakes if a prediction indicates that a human driver may not react quickly enough to avoid a collision with an object in the environment, e.g. an object or another vehicle represented in a surfel map.

As depicted in FIG. 2, the on-board system 210 includes one or more sensor subsystems 220. The sensor subsystems 220 can include a combination of components that receive reflections off of objects in the environment, such as reflections of electromagnetic radiation or reflections of sound waves, e.g., lidar systems that detect reflections of laser light, radar systems that detect reflections of radio waves, camera systems that detect reflections of visible light, and sonar systems that detect reflections of sound waves.

The sensor data generated by a given sensor generally indicates a distance, a direction, and an intensity of reflected radiation. For example, a sensor can transmit one or more pulses of electromagnetic radiation in a particular direction and can measure the intensity of any reflections, as well as the time that the reflection was received. A distance between the sensor and an object detected by the sensor can be computed by determining the amount of time elapsed between a pulse and receipt of its corresponding reflection. The sensor can continually sweep a particular space in angle, azimuth, or both. Sweeping in azimuth, for example, can allow a sensor to detect multiple objects along the same line of sight.

The sensor subsystems 220 or other components of the vehicle 202 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. In some implementations, the sensor data is camera sensor data and each group of camera sensor measurements can be represented as an image patch, e.g., an RGB image patch.

As depicted in FIG. 2, once the sensor subsystems 220 classify one or more groups of raw sensor measurements as being measures of a respective object of a particular type, the sensor subsystems 220 can compile the raw sensor measurements into a set of raw sensor data 225, and send the raw sensor data 225 to an environment prediction system 230 with a dynamic object detector 232.

The on-board system 210 also includes an on-board surfel map store 240 that stores a global surfel map 245 of the real-world. The global surfel map 245 is an existing surfel map that has been generated by combining sensor data captured by multiple vehicles navigating through the real world. Generally, every vehicle in the system 200 uses the same global surfel map 245. In some cases, different vehicles in the system 200 can use different global surfel maps 245, e.g. when some vehicles have not yet obtained an updated version of the global surfel map 245 from the server system 220.

Each surfel in the global surfel map 245 can have associated data that encodes multiple classes of semantic information for the surfel. For example, as previously discussed, for each of the classes of semantic information, each surfel in the surfel map can have one or more semantic labels characterizing a prediction for the surfel corresponding to the class, where each semantic label has a corresponding probability. As a particular example, each surfel can have multiple semantic labels, with associated probabilities, predicting the type of the object characterized by the surfel, e.g. "pole" with 80% probability, "street sign" with 15% probability, and "fire hydrant" with 5% probability.

The environment prediction system 230 can receive the global surfel map 245 and combine the surfel data in the surfel map 245 with the raw sensor data 225 to generate an environment prediction 235. The environment prediction 235 includes data that characterizes a prediction for the current state of the environment, including predictions for an object or surface at one or more locations in the environment. For example, the dynamic object detector 232 of the environment prediction system 230 can determine based on the surfel data in the surfel map 245 and the raw sensor data 225 whether a dynamic object in the environment has changed.

For example, the raw sensor data 225 captured by the sensor subsystems 220 might indicate that the environment through which the vehicle 202 is navigating has changed compared to the depiction of the corresponding environment in the global surfel map 245. In some cases, the changes might be large and discontinuous, e.g., if a new building has been constructed or a road has been closed for construction since the last time the portion of the global surfel map 245 corresponding to the environment has been updated. In some other cases, the changes might be small and continuous, e.g., if a bush has grown by an inch or a leaning pole has slightly increased its tilt. In either case, the raw sensor data 225 can capture these changes to the environment, and the environment prediction system 230 can use the raw sensor data 225 in combination with the data characterizing the environment stored in the global surfel map 245 to generate an environment prediction 235.

For one or more objects represented in the global surfel map 245, the environment prediction system 230 can use the raw sensor data 225 in combination with the global surfel map 245 to determine a probability that a particular object is currently in the environment. In some implementations, the environment prediction system 230 can use a Bayesian model to generate the predictions of which objects are currently in the environment, where the data in the global surfel map 245 is treated as a prior distribution for the state of the environment, and the raw sensor data 225 is an observation of the environment. The environment prediction system 230 can perform a Bayesian update to generate a posterior belief of the state of the environment, and include this posterior belief in the environment prediction 235. In some implementations, the raw sensor data 225 also has a probability distribution for each object detected by the sensor subsystem 220 describing a confidence that the object is in the environment at the corresponding location; in some other implementations, the raw sensor data 225 includes detected objects with no corresponding probability distribution.

For example, if the global surfel map 245 includes a representation of a particular object, and the raw sensor data 225 includes a strong detection of the particular object in the same location in the environment, then the environment prediction 235 can include a prediction that the object is in the location with high probability. If the global surfel map 245 does not include the particular object, but the raw sensor data 225 includes a strong detection of the particular object in the environment, then the environment prediction 235 might include a weak prediction that the object is in the location indicated by the raw sensor data 225. If the global surfel map 245 does include the particular object, but the raw sensor data 225 does not include a detection of the object at the corresponding location, or includes only a weak detection of the object, then the environment prediction 235 might include a prediction that has moderate uncertainty.

That is, the environment prediction system 230 might assign more confidence to the correctness of the global surfel map 245 than to the correctness of the raw sensor data 225, or vice versa. In either case, the environment prediction system 230 does not treat the raw sensor data 225 or the global surfel map 245 as a ground-truth, but rather associates uncertainty with both the surfel map 245 and the raw sensor data 225 in order to combine them. Approaching each input in a probabilistic manner can generate a more accurate environment prediction 235, as the raw sensor data 225 might have errors, e.g. if the sensors in the sensor subsystems 220 are miscalibrated, and the global surfel map 245 might have errors, e.g. if the state of the world has changed.

The environment prediction 235 generated by the environment prediction system 230 can be determined based partly on the semantic information for each object in the environment provided by the surfel map 245. For example, the environment prediction system 230 can use a Bayesian model to update the associated data of each surfel in the global surfel map 245 using the raw sensor data 225 in order to generate a prediction for each semantic class and for each object in the environment. For each particular object represented in the global surfel map 245, the environment prediction system 230 can use the semantic label(s) of the surfels corresponding to the particular object as a prior distribution for the true labels for the particular object. The environment prediction system 230 can then interpret the raw sensor data 225 in view of the associated probabilities for each class of semantic information for the particular object in order to determine an environment prediction 235 regarding the characteristics of the objects within the environment. In some implementations, the raw sensor data 225 also has a probability distribution of labels for each semantic class for each object detected by the sensor subsystem 220; and in some other implementations, the raw sensor data 225 has a single label for each semantic class for each detected object.

Continuing the previous particular example, where a particular surfel in the surfel map 245 has semantic labels that characterize the object represented by the surfel as a pole with 80% probability, a street sign with 15% probability, and fire hydrant with 5% probability, and if the sensor subsystems 220 detect a pole at the same location in the environment with high probability, then the environment prediction system 230 might generate an environment prediction 235 for the object characterizing the object as a pole with 85% probability, as a street sign with 12% probability, and as a fire hydrant with 3% probability.

The dynamic object detector 232 of the environment prediction system 230 can use semantic labels indicating the dynamism of an object represented in the surfel map 245 to determine an environment prediction 235. For example, if the representation of a location in the environment by the surfel map 245 differs from the sensor data 225 generated by sensor subsystems 220 for the respective location, one or more semantic labels indicating the dynamic nature of object at the respective location can be used to determine a probability that the environment has changed (and, thus the surfel map 245 is outdated) or a probability that the raw sensor data 225 is erroneous.

As an example, a surfel in the surfel map 245 representing an object at a particular location can include a first semantic label that indicates with a high probability that the object is of a first type (e.g., bush) and a second semantic label that indicates that the object has a high probability of being dynamic (e.g., more than 65% probability of being dynamic). The sensor data 225 can indicate that the object at the particular location is a second, different object type (e.g., a curb). In view of the semantic label indicating a high probability that the object at the particular location is dynamic, the dynamic object detector 232 of the environment prediction system 230 will predict that the object has changed since the surfel map 245 was generated, and will give priority to the raw sensor data 225. As such, the environment prediction 235 will predict that the object is of the object type detected by the sensor subsystem 220 (curb) with high probability.

In contrast, if a semantic label indicates that an object at a particular location has a low probability of being dynamic (e.g., less than 35% probability of being dynamic), the dynamic object detector 232 of the environment prediction system 230 will predict that the object has not changed since generation the surfel map 245, and will attribute the mismatch in predicted object types between the sensor data and surfel data as the result of sensor error. As such, the environment prediction system 230 will give priority to the object type identified by the corresponding semantic label in the surfel map 245, and the environment prediction 235 will predict that the object is of the object type indicated by the semantic label in the surfel map 245 with high probability.

In determining whether to give priority to the object type identified in the raw sensor data 225 versus the object type identified by the semantic label in the surfel map 245, the dynamic object detector 232 of the environment prediction system 230 can determine whether the surfel corresponding to the particular location has a semantic label indicating a probability of dynamism above a threshold probability. If the semantic label for the surfel representing the object indicates a probability of dynamism below the threshold probability, the environment prediction system 230 predicts that a mismatch between the object type indicated in the surfel map and the object type detected by the sensor subsystems 220 is the result of errors in the raw sensor data 225. As a result, the environment prediction 235 indicates the object type represented by the surfel map 245 for the object with high probability. Alternatively, the environment prediction system 230 can determine that the mismatch between the surfel map 245 and sensor data 225 is the result of a large change in the environment (e.g., the demolition of a building), and the planned path of travel for the vehicle 202 can be updated based on the raw sensor data 225 to account for the detected change.

In contrast, if the semantic label for the surfel representing the object indicates a probability of dynamism above the threshold probability, then the environment prediction system 230 predicts that a mismatch between the object type indicated in the surfel map 245 and the object type detected by the sensor subsystems 220 is the result of a change in the environment. As a result, the environment prediction 235 for the respective location indicates the object type detected by the sensor subsystems 220 for the object with a high probability.

The dynamic nature of an object represented by the surfel map 245 can be determined based on a semantic label indicating the object type for the surfel representing the object. For example, if a semantic label indicates that an object represented by a surfel has a high probability of being vegetation, the dynamic object detector 232 of the environment prediction system 230 can predict that the object represented by the surfel has a high probability of being dynamic. In contrast, if the semantic label indicates that the object represented by the surfel has a high probability of being a more permanent type of object, such as a building or asphalt, the dynamic object detector 232 of the environment prediction system 230 can predict that the object represented by the surfel has a low probability of being dynamic.

The level of confidence of the dynamism of an object based on the object type can depend on the specificity of the semantic label indicating the object type. For example, if a surfel includes a "plant" object type semantic label, it may be difficult to estimate the dynamism of the object based on the object type alone. For instance, certain plant objects, such as plants contained in plant stands or tree trunks, may not be likely to change position or size, and thus may not be highly dynamic, whereas other types of plants, such as hedges and bushes, may be more likely to be dynamic. If a more specific object type is provided by the semantic label, such as labels indicating that an object represented by the surfel is a tree trunk, a tree branch, or a leaf, rather than simply a tree or plant, the differences in dynamism between various parts of the plant can be more accurately predicted based on the object type semantic label.

In addition, the system can account for hybrid objects that can include both dynamic and non-dynamic parts. For example, a tree object may include some parts that are more dynamic, such as leaves, and other parts that are less dynamic, such as the tree trunk. As another example, a plant contained within a plant stand may include a more dynamic portion (e.g., the plant) and a less dynamic portion (e.g., the plant stand).

However, in some instances, relying on object type semantic labels alone can provide inaccurate indications of the dynamism of a particular object. For example, a plant stand might be covered with leaves for decoration and, therefore, accurately labeled as "leaf" on all its surfels. Since leaves have a relatively high probability of changing size or position, the "leaf" object type semantic label assigned to the surfels of the plant stand would indicate a high probability of dynamism for this object. However, since the plant stand underlying the leaf decoration is unlikely to change size or position, the prediction of a high probability of dynamism based on the object type semantic labels for this plant stand object is inaccurate. As such, semantic labels specifically indicating the probability of dynamism of an object represented by a surfel can also be provided to help provide a more accurate prediction of the dynamic nature of the object represented by the surfel.

The environment prediction system 230 can use the dynamic nature of an object, as identified by the dynamic object detector 232 based on one or more semantic labels in the surfel map 245, to weigh the system's 230 reliance on the sensor data 225 corresponding to that object. For example, a surfel map may indicate that the environment includes a first object with a semantic label indicating a low probability of dynamism (for example, a "building" semantic label) and a second object with a semantic label indicating a high probability of dynamism (for example, a "vegetation" semantic label). Based on this difference in dynamism between the two objects indicated by the respective semantic labels, the environment prediction system 230 can rely more heavily on the sensor data 225 corresponding to the first object with the lower probability of being dynamic during the object detection process compared to the sensor data corresponding to the second object with the higher probability of being dynamic, since the first object is less likely to change. As a result, the sensor data and the surfel data regarding the first object are more likely to be in agreement. In addition, a disagreement between the sensor data and surfel data regarding an object that is indicated to have a low probability of being dynamic in the surfel map may indicate that the surfel map needs to be updated, as objects with a low probability of being dynamic are unlikely to change without a fundamental change to the environment.

The semantic labels indicating the dynamic nature of an object can be used to plan for changes in the environment that may cause an occlusion of one or more sensors on a vehicle. An occlusion is any object in the environment that the sensors 220 of the vehicle 202 cannot see through or around. For example, certain paths of travel require that the sensors 220 on the vehicle 202 have visibility of a particular line of sight, and when one or more objects occlude the sensor's 220 visibility of the particular line of sight, the vehicle 202 cannot safely continue along the planned path of travel. As a particular example, a vehicle 202 may be on a first street and approaching a second street, and a planned path of the vehicle 202 may instruct the vehicle 202 to make a left turn onto the second street. In order to make the turn onto the second street, the sensors 220 of the vehicle 202 must have visibility of traffic along both directions of the second street in order to ensure safe operation of the vehicle 202. If an object, such as a bush, is preventing the sensors 220 from being able to accurately visualize and detect objects along both sides of the second street, the bush is considered an occlusion and the path of the vehicle 202 must be updated reduce the occlusion in order to ensure safe operation of the vehicle 202.

The surfel map 245 may include one or more surfels representing an object near a planned path of travel that have corresponding semantic labels indicating a high probability that the object is dynamic. Based on this indication that the object represented by the surfels in the surfel map 245 has a high probability of being dynamic, the environment prediction system 230 can interpret changes in the environment detected by the sensor subsystems 220 proximate the dynamic object as having a high probability of being accurate, and updating the planned path of travel based on the sensor data 225 to minimize occlusion of the sensors 220 created by the changed dynamic object.

For example, a surfel map 245 may include one or more surfels representing an object, e.g., a bush, near a planned path of travel for the vehicle 202. In addition, the surfel map 245 can include semantic labels indicating a high probability that the object represented by the surfels is dynamic. Based on this indication in the surfel map 245 that a dynamic object is located near a planned path of travel for the vehicle 202, upon approaching the particular location of the dynamic object, the sensor subsystems 220 can collect sensor data 225 to determine whether the dynamic object indicated in the surfel map 245 has changed.

The planning subsystem 250 can consider locations where dynamic objects may occlude a line of sight to objects of interest. For example, if the sensor data 225 indicates that an object at a location corresponding to the location of the dynamic object in the surfel map 245 has changed such that it would occlude the line of sight of one or more sensors of the sensor subsystem 225, the path modifier 255 of the planning subsystem 250 can generate a path of travel for the vehicle to take this into account. For example, the planning subsystem 250 can generate a path to reposition the vehicle in a position that eliminates the occlusion generated by the changed dynamic object. For example, the sensor data 225 may indicate that a bush represented in the surfel map 245 has grown in size since the surfel map 245 was generated such that it now occludes a view of cross traffic for one or more sensors of the sensor subsystem 220 when the vehicle 202 is in a particular location. In response, the planned path of travel for the vehicle 202 can be updated in real-time to avoid the occlusion generated by the bush object.

The updates to the planned path can be based on predetermined increments or based on an amount that the dynamic object has changed. For example, in response to determining that the bush object has changed to occlude a view of an area of interest for one or more of the sensors 220, the path modifier 255 of the planning subsystem 250 can update the planned path to move the vehicle 202 forward and/or left or right within the lane in predetermined increments until the sensor subsystems 220 detect that the line of sight sensors are no longer occluded by the bush (e.g., until the occluded sensors no longer detect a bush object type).

The distance that the position of the vehicle 202 must be moved in one or more directions in order for the line of sight of the sensors 220 to a particular area of interest to be unoccluded can be calculated based on the amount of change of the shape of the dynamic object. For example, the distance that the vehicle 202 must be moved to prevent the line of sight of the sensors 220 to a particular area of interest from being occluded by the bush object can be calculated by the planning subsystem 250 based on the amount of change of to the shape dynamic bush object, as determined based on the sensor data 225 and the representation of the bush object in the surfel map 245. Once the distance necessary to prevent occlusion has been calculated by the sensor subsystem 220, the vehicle 202 can be automatically moved by the calculated amount in the determined direction in order to prevent occlusion of the sensor subsystem 220 by the bush object.

In contrast, the surfel map 245 may indicate that an object at a particular location has a low probability of being dynamic (such as a surfel with a semantic label indicating that the object is a building), and thus is unlikely to change. If the raw sensor data 225 generated by the sensor subsystems 220 indicates that the object at the location has changed compared to the representation of the object in the surfel map 245, the environment prediction system 230 can rely more heavily on the representation in the surfel map 245 in generating an environment prediction 235 due to the non-dynamic label for the object in the surfel map 245, and can attribute the mismatch between the surfel map 245 and sensor data 225 to sensor error, or can run a check to see if sensor error of a similar type is detected elsewhere. As such, the vehicle 202 can be controlled to continue following the planned path of travel generated based on the surfel map 245. Alternatively, the environment prediction system 230 can determine that the mismatch between the surfel map 245 and sensor data 225 is the result of a large change in the environment (e.g., the demolition of a building), and the planned path of travel for the vehicle 202 can be updated based on the raw sensor data 225 to account for the detected change.

Surfel maps can also be used to confirm the accuracy of sensor data when the sensor data indicates that no occlusion or obstacle is present at a particular location. In particular, a surfel map 245 indicating that a particular area or location within an environment does not contain any obstacles or dynamic objects near a vehicle's planned path of travel can be used by the environment prediction system 230 to more accurately interpret the sensor data 225 received from the sensor subsystem 230. For example, a surfel map 245 for a particular location, such as a parking lot, may indicate that there are no dynamic objects within a particular area. In addition, the planned path of travel generated by the system 200 can account for any objects in the environment as represented by the surfel map 245 such that the line of sight sensors 220 will not be unnecessarily occluded or obstructed by the objects in the environment as represented by the surfel map 245. Therefore, based on the surfel map 245 indicating a lack of dynamic objects at a particular location, as well as a lack of non-dynamic objects anticipated to occlude the line of sight of the sensors (e.g., a bridge or sign covering a portion of the roadway) at the particular location, the environment prediction system 235 can assume that the line of sight sensor subsystem 220 should not be occluded when the vehicle is located at the particular location.

Further, if a surfel map indicates that there is one or more likely occluding objects near the previously planned path, an updated path for the vehicle can be generated such that the vehicle avoids the area with likely occluding objects. For example, for areas that include objects that may cause small scale occlusions, minor changes to the planned path can be provided, such as nudging the vehicle 202 left or right within the lane along the planned path. Conversely, for areas that include objects that may cause large scale occlusions, more significant changes to the planned path can be provided, such as changing which streets the vehicle 202 travels along.

The environment prediction system 230 can rely on the raw sensor data 225 generated by the sensor subsystems 220 with increased accuracy when the vehicle 202 is at the particular location as the line of sight of the sensors of the sensor subsystem 220 should not be occluded when the vehicle 202 positioned at the particular location. Therefore, if the sensor data 225 generated by the sensor subsystems 220 indicates that there are not any objects in the vicinity of the vehicle 202, and the surfel map 245 does not indicate any objects at the current location vehicle 202, the environment prediction system 230 can confirm that the sensor data 225 indicating no detected objects is accurate, and it is not the result of a sensor error causing a failure to detect objects.

Conversely, the surfel map 245 may indicate that one or more objects near a planned path of travel are likely to occlude the line of sight of one or more sensors of the sensor subsystem 220 to an area of interest. For example, as a vehicle 202 drives along a road near an alleyway exit, the view of the alleyway by the sensor subsystem 220 may be occluded, even when the vehicle is close to the exit of the alleyway (e.g., by buildings lining the alleyway). As such, the sensor subsystem 220 will be prevented from detecting objects, such as cars or bicyclists, exiting the alleyway as the vehicle 202 approaches the alleyway exit. As such, the surfel map 245 indicates that a portion of the alleyway (i.e., an area of interest) is occluded from the line of sight of the sensors 220. Based on this predicted occlusion, the planned path of travel for the vehicle 202 can be updated to avoid the occlusion and prevent a potential collision between the vehicle 202 and an object exiting the alleyway. For example, an updated planned path can be generated that cause the vehicle 202 to change lanes to a lane further from the alleyway exit, thus reducing the occlusion of the line of sight of the sensors 220 to the alleyway exit.

If the sensor data 225 generated by the sensor subsystems 220 indicates that there is a first type of object at a particular location near the vehicle 202, and the surfel map 245 indicates a second, non-dynamic object type (or no object) at the same location, the environment prediction system 230 can rely on the sensor data 225 and provide an environment prediction 235 that the environment has changed compared to the representation in the surfel map 245. For example, the sensor data 225 may indicate that a car object is at a particular location that is visible from the planned path of travel for the vehicle 202, whereas the surfel map 245 may indicate a non-dynamic asphalt object at the same location. In response, based on the lack of dynamic objects at the particular location as represented by the surfel map 245, the planning subsystem 250 can rely on the sensor data 225 and the path modifier 255 can update the planned path of travel for the vehicle 202 based on the detected car object to avoid collision between the vehicle 202 and the detected object.

As another example, the surfel map 245 may depict an empty street corner near the planned path. As the vehicle 202 travels past the street corner, the sensor subsystem 220 may detect an object at the street corner, such as a truck parked at the street corner. Based on sensor data 225 indicating the truck parked at the street corner, the planning subsystem 250 can determine that environment has changed compared to the depiction in the surfel map 245 and that the previously planned path for the vehicle 202 would result in a collision between the vehicle 202 and the parked truck. Based on this determination, the planning subsystem 250 can generate an updated planned path of travel for the vehicle 202 that avoids collision with the truck parked at the street corner.

As depicted in FIG. 2, the environment prediction system 230 can provide the environment prediction 235 to a planning subsystem 250, which can use the environment prediction 130 to make autonomous driving decisions, e.g., generating a planned trajectory for the vehicle 202 through the environment. By interpreting the raw sensor data 225 in view of the semantic labels for the corresponding surfels in the global surfel map 245, on-board system 210 can generate an improved environment prediction 235 due to the additional context provided by the various characteristics and probabilities identified in the semantic labels. As a result, the autonomous driving decisions generated by the planning subsystem 250 based on the environment prediction 235 can be improved and executed with increased confidence.

The environment prediction system 230 can provide the raw sensor data 225 to a raw sensor data store 260 located in the server system 220. In some implementations, if, based on the raw sensor data 225, the environment prediction system 230 determines that the environment has changed such that the environment differs from the global surfel map 245 (i.e., the global surfel map 245 is outdated), the raw sensor data 225 can be used by the server system 220 to generate an updated global surfel map 275.

The server system 220 is typically hosted within a data center 224, which can be a distributed computing system having hundreds or thousands of computers in one or more locations. The server system 220 includes a raw sensor data store 260 that stores raw sensor data generated by respective vehicles navigating through the real world. As each vehicle captures new sensor data characterizing locations in the real world, each vehicle can provide the sensor data to the server system 220. The server system 220 can then use the sensor data to generate or update the global surfel map 275 that every vehicle in the system 200 uses. That is, when a particular vehicle discovers that the real world has changed in some way, e.g. construction has started at a particular intersection or a street sign has been taken down, the vehicle can provide sensor data to the server system 220 so that the rest of the vehicles in the system 200 can be informed of the change.

The server system 220 also includes a global surfel map store 280 that maintains the current version of the global surfel map 285.

A surfel map updating system 270, also hosted in the server system 220, can obtain the current global surfel map 285 and a batch of raw sensor data 265 from the raw sensor data store 260 in order to generate an updated global surfel map 275, including updated semantic labels. In some implementations, the surfel map updating system 270 updates the global surfel map at regular time intervals, e.g. once per hour or once per day, obtaining a batch of all of the raw sensor data 265 that has been added to the raw sensor data store 260 since the last update. In some other implementations, the surfel map updating system 270 updates the global surfel map whenever new raw sensor data 225 is received by the raw sensor data store 260. In some implementations, the surfel map updating system 270 generates the updated global surfel map 275 in a probabilistic way.

For each measurement in the batch of raw sensor data 265, the surfel map updating system 270 can determine a surfel in the current global surfel map 285 corresponding to the location in the environment of the measurement, and combine the measurement with the determined surfel. If there is not currently a surfel at the location of a new measurement, then the surfel map updating system 270 can generate a new surfel according to the measurement.

The surfel map updating system 270 can also update each surfel in the current global surfel map 285 that did not have a corresponding new measurement in the batch of raw sensor data 265 to reflect a lower certainty that an object is at the location corresponding to the surfel. In some cases, e.g. if the batch of raw sensor data 265 indicates a high confidence that there is not an object at the corresponding location, the surfel map updating system 270 can remove the surfel from the updated global surfel map 275 altogether. In some other cases, e.g. when the current global surfel map 285 has a high confidence that the object characterized by the surfel is permanent, and therefore that the lack of a measurement of the object in the batch of raw sensor data 265 might be an error, the surfel map updating system 270 might keep the surfel in the updated global surfel map 275 but decrease the confidence of the updated global surfel map 275 that an object is at the corresponding location.

In addition to adding and removing surfels in the global surfel map 285 based on the raw sensor data 265, the surfel map updating system 270 can also update the semantic labels associated with each of the surfels in the updated surfel map 275 based on the raw sensor data 265. For example, in some implementations, the surfel map updating system 270 includes a trained machine learning model 290 that can be used to process the raw sensor data 265 to generate one or more semantic labels for each surfel in the updated surfel map 175.

The machine learning model 290 can be trained to identify one or more characteristics of an object represented by raw sensor data 265 and generate one or more semantic labels for a surfel representing the object. The machine learning model 290 can be trained using a set of training data that includes raw sensor data that has been labeled by human users with one or more semantic labels (e.g., object type, reflectivity, dynamism, color, and/or opacity). The training data can include user-labeled camera sensor data, user-labeled laser sensor data, user-labeled laser radar data, or a combination thereof. Once trained, the machine learning model 290 can be used to automatically generate or update semantic labels for a surfel map based on the raw sensor data 265 provided by one or more vehicles 202 traversing the environment.

After generating the updated global surfel map 275 with updated semantic labels, the surfel map updating system 270 can store the updated global surfel map 275 in the global surfel map store 280, replacing the stale global surfel map 285. Each vehicle in the system 200 can then obtain the updated global surfel map 275 from the server system 220, e.g., through a wired or wireless connection, replacing the stale version stored in the vehicle's on-board map store 240 with the retrieved updated global surfel map 275. In some implementations, each vehicle in the system 200 retrieves an updated global surfel map 275 whenever the global surfel map is updated and the vehicle is connected to the server system 220 through a wired or wireless connection. In other implementations, each vehicle in the system 200 retrieves the most recent updated global surfel map 275 at regular time intervals, e.g. once per day or once per hour.

Figure 3:
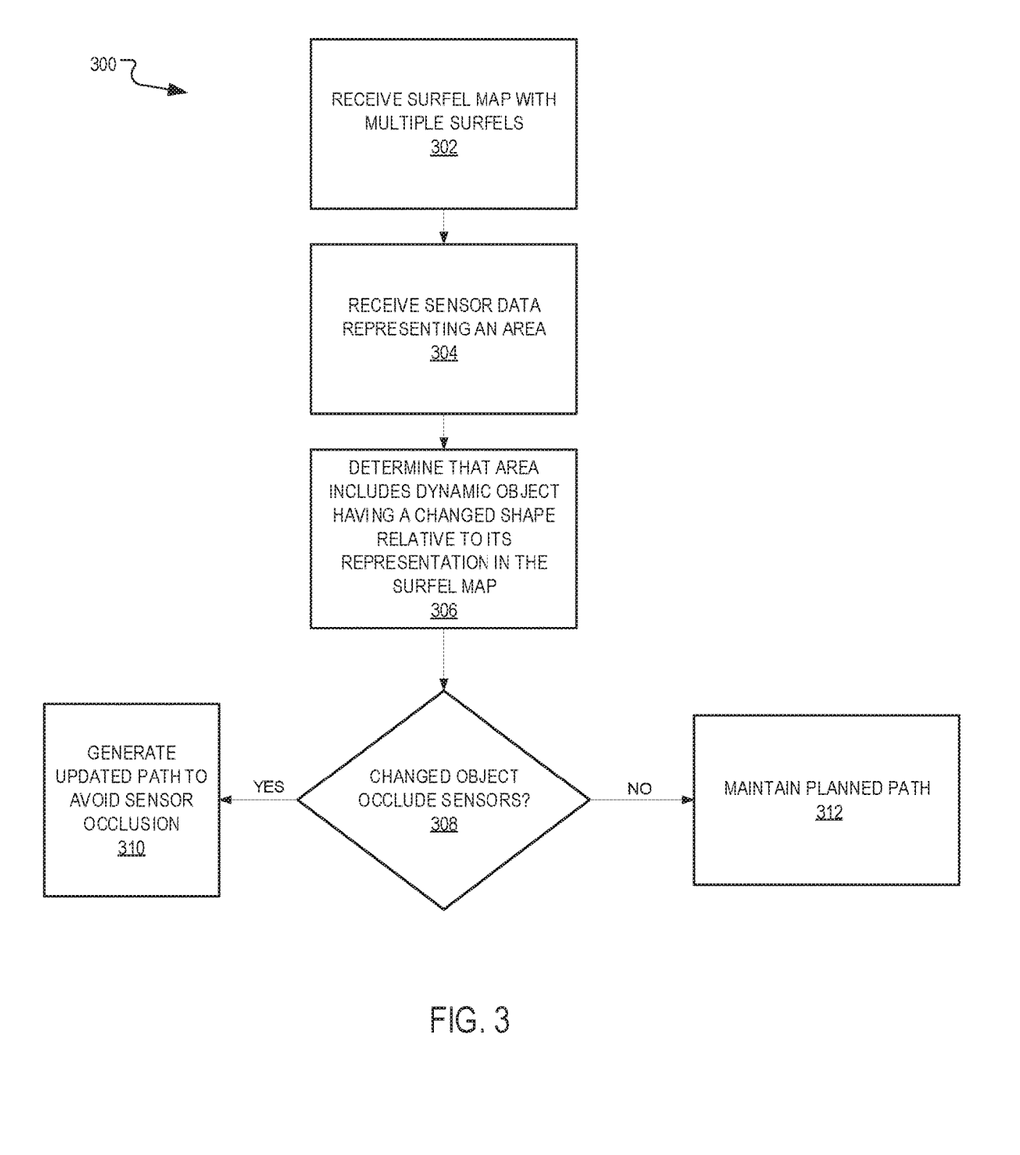
FIG. 3 is a flow diagram of an example process for combining surfel data and sensor data.

FIG. 3 is a flow diagram of an example process 300 for combining surfel data and sensor data to determine the optimal path for a vehicle in real time ("on the fly"). For convenience, the process 300 will be described as being performed by a system of one or more computers located in one or more locations. For example, an environment prediction system, e.g., the environment prediction system 230 depicted in FIG. 2, appropriately programmed in accordance with this specification, can perform the process 300.

The system receives a surfel map representing surfaces in an area in which a vehicle is located (step 302). The received surfel map includes multiple surfels. Each surfel in the surfel map can correspond to a respective different location in the environment. Each surfel in the surfel map can also have associated data that includes one or more semantic labels. Each semantic label included in the surfel map can correspond to a respective surfel and can represent a predicted property of an object represented by the surfel. For example, each surfel can include one or more semantic labels that provide a prediction t of the dynamism of the object represented by the surfel. The surfel data in the received surfel map can be generated from data captured by one or more vehicles navigating through the environment at respective previous time points, e.g., the same vehicle that captured the sensor data and/or other vehicles.

The system obtains sensor data representing the area in which the vehicle is located (step 304). The sensor data can be captured by one or more sensors of a vehicle navigating the environment, e.g. the sensor subsystems 220 of the vehicle 202 depicted in FIG. 2. In some implementations, the sensor data is image data captured by one or more camera sensors on the vehicle. In some implementations, the sensor data is received in real-time as the vehicle travels through the environment.

The system determines based on the sensor data that the area in which the vehicle is located includes a dynamic object having a changed shape relative to its representation in the surfel map (step 306). For example, the received sensor data can be image data or lidar data that indicates the presence of a dynamic object at a particular location that is adjacent to a path for the vehicle in the area in which the vehicle is located. For example, a dynamic object, such as a bush or hedge, may continuously grow over time such that the dimensions of the bush may be different that those depicted in the previously-generated surfel map 245. In some implementations, the sensor data is compared to one or more surfels in the surfel map corresponding to the particular location of the detected object. As previously discussed, a change in size of a dynamic object can cause the line of sight of one or more sensors 220 on the vehicle 202 to become occluded such that the sensors 220 cannot accurately determine whether a planned path of travel is safe or contains a potential obstacle.

For example, objects represented by the surfel map that have a high probability of being dynamic, such as bushes, hedges, and other vegetation, have a higher probability of changing in such a way that will occlude the line of sight of one or more sensors to an area of interest. For instance, a bush proximate to a path for the vehicle may have grown since the surfel map was generated, and, as a result of the growth of the bush, one or more sensors on the vehicle may be occluded by the bush when the vehicle is positioned near the bush. As previously discussed, the dynamic nature of an object depicted in a surfel map can be determined based on one or more semantic labels corresponding to the surfel(s) representing the object. Based on the dynamic nature of the object represented in the surfel map via semantic labels, it can be determined that the area in which the vehicle is located includes an object that may occlude one or more sensors of the sensor subsystem 220 of the vehicle 202.

In addition, dynamic objects indicated in the surfel map 245 can be used to plan improved paths for the vehicle 202 in advance in order to optimize the planned path of travel to avoid potential occlusions of the line of sight of the sensors 220 of the vehicle 202. For example, if the surfel map 245 indicates a dynamic bush object in the environment, the path of travel for the vehicle 202 can be preplanned to avoid travel near the dynamic bush object (e.g., by taking a different street or a lane further away from the bush) to prevent potential occlusion of the line of sight of the sensors 220 of the vehicle 202.

Conversely, the surfel map can represent that there are no dynamic objects in the area in which the vehicle is located (e.g., if the area is an empty parking lot) or that the area only includes non-dynamic objects (e.g., buildings, asphalt, etc.), as indicated by the semantic labels for the objects represented in the surfel map. The objects represented in the surfel map are accounted for when the planned path for the vehicle is generated, and the path for the vehicle is planned to avoid occlusion of the sensor subsystem by the objects as they are represented in the surfel map. As such, if the surfel map indicates that the area in which the vehicle is currently located does not include any objects or only includes non-dynamic objects, it can be determined based on the surfel map that the area in which the vehicle is located does not include an object that may occlude one or more sensors of the sensor subsystem 220 of the vehicle 202.

The system determines whether the detected change in shape of the dynamic object will result in occlusion of the line of sight of the sensor subsystem to an area of interest (308). If the planning subsystem 250 determines that the changed dimensions of the dynamic object may occlude the line of the sight of the sensor subsystem 220 to an area of interest, the planning subsystem 250 generates an updated path for the vehicle to travel that avoids an occlusion by the changed shape of the object on a line of sight of one or more sensors to an area of interest (310). The area of interest can be any appropriate area from which the vehicle needs to collect data in order to make driving decisions. For example, the area of interest can be an area from which the system predicts that cross traffic, cyclists, or pedestrians are likely to originate.

As an example, if a detected bush object has changed dimensions since the surfel map was generated (e.g., because the bush has grown), an updated planned path for the vehicle can be generated to avoid occlusion of the sensor subsystems 220 by the bush based on its updated dimensions. In some implementations, the planned path of the vehicle 202 is updated such that a front portion of the vehicle is advanced beyond the detected object based on the dimensions of the detected object in the sensor data. In some implementations, the planned path of the vehicle 202 is updated such that the vehicle is move laterally (e.g., left or right) within the lane based on the dimensions of the detected object in the sensor data.

In response to determining that the detected object has changed dimensions relative to the representation of the object at the particular location in the surfel map, the planned path can be updated by causing the vehicle to incrementally move forward and/or laterally a predetermined amount until the sensors are no longer occluded. For example, if it is determined that a bush object in the area near the vehicle has grown to occlude the sensors when the vehicle is positioned along the planned path, the planned path can be updated in real time such that the vehicle is moved forward a predetermined amount. After causing the vehicle to move forward by the predetermined amount, new sensor data can be collected to determine whether the bush object is still occluding the sensor subsystem. The vehicle can continue to "inch forward" and/or side to side in predetermined increments until the bush object is no longer detected by the sensor subsystem, and thus is no longer occluding the one or more sensors.

In response to determining that the detected object has changed dimensions relative to the representation of the object at the particular location in the surfel map, the planned path can be updated such that the vehicle takes a different route along an updated path (e.g., along a different street) in order to avoid the occlusion generated by the detected object. Further, upon detecting that an object may result in a problematic occlusion of the sensor subsystem 220, the planning subsystem 250 can update the planned path to include a turn in the planned path that avoids the potential occlusion.

If the planning subsystem 250 determines that the changed shape of the dynamic object will not occlude the line of the sight of the sensor subsystem 220, the previously planned path for the vehicle 202 is maintained (312). For example, the previously planned path can be generated in such a manner as to avoid occlusions with the objects depicted in the surfel map 245. Therefore, while the surfel map 245 may include an object that has the potential to cause an occlusion due to its dynamic nature (e.g., a hedge or bush), if the detected object has the same dimensions as the corresponding representation of the object in the surfel map, or the change in dimensions or shape of the dynamic object is small enough that the change does not result in sensor occlusion, the sensor subsystem will not be occluded by the detected object while traveling along the planned path. As such, in response to determining that the detected object has not changed shape such that the sensor subsystem 220 is likely to become occluded, the vehicle will continue along the planned path.

The previously planned path for the vehicle 202 can be maintained until a sensor of the sensor subsystem 220 detects an object along the planned path that may result in collision with the vehicle 202. For instance, if an object is detected and the area in which vehicle is located does not include any objects that may occlude the one or more sensors, the system can adjust the path for the vehicle 202 to avoid collision with the object detected by the sensors. For example, if it is determined that the surfel map of the area in which vehicle is located does not include a representation of an object that may occlude the one or more sensors, it is determined that one or more sensors of the vehicle 202 should not be occluded and able to detect any obstacles in the planned path of travel. As such, the detection of an object along the planned path by the sensor subsystem can indicate the presence of an obstacle in the planned path of travel. For instance, if the sensor subsystem 220 detects an object along the path of travel (e.g., an oncoming car) and the surfel map indicates that the area in which the vehicle 202 is located does not include any objects that could occlude the sensors 220 (e.g., vegetation), then the sensor data 225 provided by the sensor subsystem 220 can be relied on with a high level of certainty. As a result, the planned path of travel for the vehicle can be adjusted to avoid collision between the vehicle 202 and the object detected by the sensors 220, if necessary.

As a particular example, the vehicle may be on a first street and approaching a second street, and a planned path of the vehicle may instruct the vehicle to make a right turn onto the second street. The surfel map includes surfels representing a hedge on the left side of the first street. Each of the surfels representing the hedge include a semantic label that labels the respective surfel as "hedge" with a high probability, indicating not only that the object is a hedge, but also that it has a high probability of being dynamic and is likely to change (e.g., that the hedge can grow or be trimmed back). Using this existing surfel data, before the vehicle arrives at the second street, the planned path for the vehicle may have included stopping the vehicle at particular position on the first street in order to position the sensors of the vehicle to be able observe the oncoming traffic around the hedge. However, as the vehicle approaches the second street, the sensors capture sensor data that indicates that the hedge has grown (i.e., changed size). Based on the fact that the surfel map represents a dynamic object (a hedge) at the location corresponding to the detected object, the system can give priority to the sensor data to determine the current dimensions of the detected hedge object. As such, the system can combine the surfel data with semantic labels indicating the object as "hedge" and the sensor data to generate a new object prediction for the hedge that represents its current dimensions. The planning subsystem can process the generated object prediction to generate an updated planned path for the vehicle so that the vehicle can take a different particular position on the first street in order to be able to observe the oncoming traffic around the hedge.

In another example, the vehicle may be on a first street and approaching a second street, and a planned path of the vehicle may instruct the vehicle to make a right turn onto the second street. The surfel map may indicate that the area near the intersection of the first street and the second street does not include any occluding objects (i.e., objects that the sensors cannot see through or around). As such, the sensors of the vehicle should be able to accurately detect oncoming traffic moving towards the vehicle on the second street when the vehicle is positioned along the planned path near the intersection. As the vehicle approaches the second street, the sensors capture sensor data that indicates that there are no objects in the second street along the planned path. The system can combine the surfel data indicating that the area near the intersection is free of occluding objects and the sensor data indicating no oncoming objects to determine that sensor data is accurate and that the vehicle is safe to make a right turn onto the second street, rather than attributing the lack of detected objects to sensor error.

The system can perform a Bayesian update to generate the object prediction based on the surfel data and sensor data. That is, for each location represented in the surfel map, the system can determine that the semantic label(s) for the surfel corresponding to the location is a prior distribution for the object prediction, and update the associated data using the sensor data to generate the object prediction as the posterior distribution.

As a particular example, for each semantic label corresponding to a surfel, the system can update the probability associated with the semantic label using Bayes' theorem:

$$P(H|E) = \frac{P(E|H)}{P(E)} \cdot P(H),$$

where H is the class of information represented by the semantic label (e.g., whether the object at the location is vegetation) and E is the sensor data. Here, P(H) is the prior probability corresponding to the class of information in the semantic label, and P(E|H) is probability of the sensors producing that particular sensor data given that the class of information is true. Thus, P(H|E) the posterior probability for the class of information represented by the semantic label. In some implementations, the system can execute this computation independently for each class of information.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method comprising:
  receiving a previously-generated surfel map depicting an area in which a vehicle is located, the surfel map comprising a plurality of surfels, each surfel corresponding to a respective different location in the area in which a vehicle is located;
  receiving, from one or more sensors, sensor data representing the area in which the vehicle is located;
  determining, based on the sensor data, that the area in which a vehicle is located includes a dynamic object having a changed shape relative to its representation in the surfel map; and
  generating an updated path for the vehicle to travel that avoids an occlusion by the changed shape of the dynamic object of a line of sight of one or more sensors to an area of interest.

Embodiment 2 is the method of embodiment 1, wherein the area of interest corresponds to a location from which cross traffic, pedestrians, or cyclists are predicted to originate.

Embodiment 3 is the method of any of embodiments 1 or 2, further comprising:
  in response to determining that the area in which the vehicle is located includes a dynamic object having a changed shape relative to its representation in the surfel map, determining that the changed shape will result in occlusion of a line of sight of the one or more sensors to the area of interest;
  wherein the updated path is generated in response to determining that the changed shape will result in occlusion of the line of sight of the one or more sensors to the area of interest.

Embodiment 4 is the method of embodiment 3, wherein generating an updated path for the vehicle to travel comprises causing the vehicle to move forward a predetermined amount.

Embodiment 5 is the method of embodiment 3, wherein generating an updated path for the vehicle to travel comprises causing the vehicle to advance a front portion of the vehicle beyond the dynamic object.

Embodiment 6 is the method of embodiment 3, wherein generating an updated path for the vehicle to travel comprises causing the vehicle to move forward an amount corresponding to the change in dimensions of the dynamic object as determined based on the sensor data.

Embodiment 7 is the method of any of embodiments 1-6, wherein determining, based on the sensor data, that the area in which a vehicle is located includes a dynamic object having a changed shape relative to its representation in the surfel map comprises determining that one or more semantic labels corresponding to one or more surfels in the surfel map indicate an object in the area as dynamic.

Embodiment 8 is the method of any of embodiments 1-7, further comprising:
determining that the changed shape will not result in occlusion of a line of sight of the one or more sensors to the area of interest; and
in response to determining that the changed shape will not result in occlusion of the line of sight of the one or more sensors to the area of interest, causing the vehicle to travel along a previously planned path.

Embodiment 9 is a system comprising: one or more computers and one or more storage devices storing instructions that are operable, when executed by the one or more computers, to cause the one or more computers to perform the method of any one of embodiments 1-8.

Embodiment 10 is a computer storage medium encoded with a computer program, the program comprising instructions that are operable, when executed by data processing apparatus, to cause the data processing apparatus to perform the method of any one of embodiments 1-8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A computer-implemented method comprising:
receiving a previously-generated surfel map depicting an area in which a vehicle is located, the surfel map comprising a plurality of surfels generated by a plurality of other vehicles obtaining sensor data in the area, each surfel corresponding to a respective different location in the area in which a vehicle is located;
receiving, in real-time from one or more sensors, sensor data representing the area in which the vehicle is located;
determining, based on comparing a representation of an object detected by the sensor data to one or more surfels corresponding to the object detected by the sensor data, that the area in which a vehicle is located includes a dynamic object having a changed shape relative to its representation in the surfel map;
determining that the changed shape of the dynamic object introduces an occlusion of a line of sight between a location of the vehicle and an area of interest; and
in response, generating an updated path for the vehicle to travel that avoids the occlusion introduced by the changed shape of the dynamic object and establishes a line of sight between one or more sensors of the vehicle and the area of interest.

2. The method of claim 1, wherein the area of interest corresponds to a location from which cross traffic, pedestrians, or cyclists are predicted to originate.

3. The method of claim 1, wherein generating an updated path for the vehicle to travel comprises causing the vehicle to move forward a predetermined amount.

4. The method of claim 1, wherein generating an updated path for the vehicle to travel comprises causing the vehicle to advance a portion of the vehicle beyond the dynamic object.

5. The method of claim 1, wherein generating an updated path for the vehicle to travel comprises causing the vehicle to move forward an amount corresponding to the change in dimensions of the dynamic object as determined based on the sensor data.

6. The method of claim 1, wherein determining, based on comparing a representation of an object detected the sensor data to one or more surfels corresponding to the object detected by the sensor data, that the area in which a vehicle is located includes a dynamic object having a changed shape relative to its representation in the surfel map comprises determining that one or more semantic labels corresponding to one or more surfels in the surfel map indicate an object in the area as dynamic.

7. The method of claim 1, further comprising:
determining that the changed shape will not result in occlusion of a line of sight of the one or more sensors to the area of interest; and
in response to determining that the changed shape will not result in occlusion of the line of sight of the one or more sensors to the area of interest, causing the vehicle to travel along a previously planned path.

8. A system comprising one or more computers and one or more storage devices storing instructions that are operable, when executed by the one or more computers, to cause the one or more computers to perform operations comprising:
receiving a previously-generated surfel map depicting an area in which a vehicle is located, the surfel map comprising a plurality of surfels generated by a plurality of other vehicles obtaining sensor data in the area, each surfel corresponding to a respective different location in the area in which a vehicle is located;
receiving, in real-time from one or more sensors, sensor data representing the area in which the vehicle is located;

determining, based on comparing a representation of an object detected by the sensor data to one or more surfels corresponding to the object detected by the sensor data, that the area in which a vehicle is located includes a dynamic object having a changed shape relative to its representation in the surfel map;

determining that the changed shape of the dynamic object introduces an occlusion of a line of sight between a location of the vehicle and an area of interest; and in response, generating an updated path for the vehicle to travel that avoids the occlusion introduced by the changed shape of the dynamic object and establishes a line of sight between one or more sensors of the vehicle and the area of interest.

9. The system of claim 8, wherein the area of interest corresponds to a location from which cross traffic, pedestrians, or cyclists are predicted to originate.

10. The system of claim 8, wherein generating an updated path for the vehicle to travel comprises causing the vehicle to move forward a predetermined amount.

11. The system of claim 8, wherein generating an updated path for the vehicle to travel comprises causing the vehicle to advance a portion of the vehicle beyond the dynamic object.

12. The system of claim 8, wherein generating an updated path for the vehicle to travel comprises causing the vehicle to move forward an amount corresponding to the change in dimensions of the dynamic object as determined based on the sensor data.

13. The system of claim 8, wherein determining, based on comparing a representation of an object detected the sensor data to one or more surfels corresponding to the object detected by the sensor data, that the area in which a vehicle is located includes a dynamic object having a changed shape relative to its representation in the surfel map comprises determining that one or more semantic labels corresponding to one or more surfels in the surfel map indicate an object in the area as dynamic.

14. The system of claim 8, wherein the operations further comprise:

determining that the changed shape will not result in occlusion of a line of sight of the one or more sensors to the area of interest; and in response to determining that the changed shape will not result in occlusion of the line of sight of the one or more sensors to the area of interest, causing the vehicle to travel along a previously planned path.

15. One or more non-transitory computer storage media encoded with computer program instructions that when executed by a plurality of computers cause the plurality of computers to perform operations comprising:

receiving a previously-generated surfel map depicting an area in which a vehicle is located, the surfel map comprising a plurality of surfels generated by a plurality of other vehicles obtaining sensor data in the area, each surfel corresponding to a respective different location in the area in which a vehicle is located;

receiving, in real-time from one or more sensors, sensor data representing the area in which the vehicle is located;

determining, based on comparing a representation of an object detected by the sensor data to one or more surfels corresponding to the object detected by the sensor data, that the area in which a vehicle is located includes a dynamic object having a changed shape relative to its representation in the surfel map; determining that the changed shape of the dynamic object introduces an occlusion of a line of sight between a location of the vehicle and an area of interest; and in response, generating an updated path for the vehicle to travel that avoids the occlusion introduced by the changed shape of the dynamic object and establishes a line of sight between one or more sensors of the vehicle and the area of interest.

16. The one or more computer storage media of claim 15, wherein the area of interest corresponds to a location from which cross traffic, pedestrians, or cyclists are predicted to originate.

17. The one or more computer storage media of claim 15, wherein generating an updated path for the vehicle to travel comprises causing the vehicle to move forward an amount corresponding to the change in dimensions of the dynamic object as determined based on the sensor data.

18. The one or more computer storage media of claim 15, wherein generating an updated path for the vehicle to travel comprises causing the vehicle to move forward a predetermined amount.

19. The one or more computer storage media of claim 15, wherein generating an updated path for the vehicle to travel comprises causing the vehicle to advance a portion of the vehicle beyond the dynamic object.

20. The one or more computer storage media of claim 15, wherein determining, based on comparing a representation of an object detected the sensor data to one or more surfels corresponding to the object detected by the sensor data, that the area in which a vehicle is located includes a dynamic object having a changed shape relative to its representation in the surfel map comprises determining that one or more semantic labels corresponding to one or more surfels in the surfel map indicate an object in the area as dynamic.

* * * * *